United States Patent
Chung

(10) Patent No.: US 6,640,619 B2
(45) Date of Patent: Nov. 4, 2003

(54) AUTOMOBILE ENGINE MISFIRE DETECTING METHOD

(75) Inventor: Young-Kyo Chung, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/029,932

(22) Filed: Dec. 31, 2001

(65) Prior Publication Data
US 2003/0015026 A1 Jan. 23, 2003

(30) Foreign Application Priority Data
Jul. 18, 2001 (KR) .................................... 2001-0043057

(51) Int. Cl.[7] ............................................. B01M 15/00
(52) U.S. Cl. ..................................................... 73/117.3
(58) Field of Search ................................ 73/117.3, 116, 73/118.1; 123/436, 438, 440, 489–491; 701/1, 102, 104, 110

Primary Examiner—Kamand Cuneo
Assistant Examiner—Monica D. Harrison
(74) Attorney, Agent, or Firm—Antonelli, Terry, Stout & Kraus, LLP

(57) ABSTRACT

An automobile engine misfire detecting method adapted to use a wide—range oxygen sensor mounted at a gas exhausting system wherein an abrupt man—made concentration change of oxygen is generated prior to entry of conventional misfire detection judging logic and response characteristic of wide—range oxygen sensor is measured therefrom, on which standard value of misfire detection judgment and standard phase angle range for distinguishing misfired cylinder are corrected to perform the misfire detection and misfired cylinder discrimination, thereby enabling to minimize the influence caused by aged wide—range oxygen sensor and characteristics of each sensor and to effect a more accurate detecting operation.

5 Claims, 5 Drawing Sheets

AUTOMOBILE ENGINE MISFIRE DETECTING METHOD

BACKGROUND OF THE INVENTION

1. Field of the Invention

The present invention relates to a method for detecting misfire in an automobile engine, and more particularly to an automobile engine misfire detecting method using a response signal from a wide—range oxygen sensor to detect misfiring in an automobile engine.

2. Description of the Prior Art

According to the conventional detecting and judging method of engine misfire, as illustrated in FIGS. 1 and 2, an Electronic Control Unit (ECU) receives information on engine load, engine Revolutions Per Minute (RPM), cooling water temperature, and receives signals from a crank angle sensor, a phase sensor and a wide—range oxygen sensor mounted on a junction point of the exhaust manifold, where the signals from the wide-band oxygen sensor are sampled based on crank angle under a predetermined operational condition to calculate a fluctuated incline curve, and when the incline of the signal surpasses a standard value under a predetermined engine load and engine RPM, it is determined that a misfire has occurred in the engine.

At the same time, a phase difference is calculated between a second peak position of a fluctuated incline curve of the signal from the wide—range oxygen sensor and signal from the phase sensor to compare the same with a standard phase angle range, by which a judgment is made on from which cylinder the misfire has occurred to enable lighting of a warning light of "Check Engine".

In other words, when a misfire occurs, a large quantity of oxygen is generated from the exhaust gas and a sudden change of oxygen concentration is detected by a wide—range oxygen sensor, by which it is judged that a misfire has occurred when the fluctuated incline curve of the signal from the wide—range oxygen sensor for showing changes of oxygen concentration in a predetermined engine load and engine RPM surpasses a standard value. The reason of using the fluctuated incline curve of the signal instead of signal itself from the wide—range oxygen sensor is that, even in a normal burnt state, the signal (voltage) from the wide—range oxygen sensor is increased when driving is performed in a low air fuel ratio, such that distinction should be made therefrom.

Next, the following principle is applied to judge from which cylinder a misfire has occurred.

When a misfire is generated in a cylinder, misfired exhaust gas is discharged via an exhaust manifold to enable detecting of changes of oxygen concentration by way of the wide—range oxygen sensor.

In case misfire occurs in the nth time, the abrupt change of oxygen concentration detected by the wide—range oxygen sensor is detected in the n+1 time, which is a general phenomenon where the misfired exhaust gas is not discharged from the exhaust manifold at one time only to be mixed with other exhaust gases discharged from other cylinders.

FIG. 3 illustrates the nth time of misfire relative to the n+1 time of oxygen concentration change, where, when misfire occurs one time at crank angle of approximately 300~500 degrees, it can be noted that sudden changes (Peaks) of oxygen concentration are detected respectively at approximately 900 degrees and 1,300 degrees of crank angle.

In a generalized form, when the nth time of continuous misfire occurs at one cylinder, n+1 time of peaks occur over n+1 cycle, and when the continuous misfires occur at two cylinders, it can be noted that peaks of 2n+1 time occur over n+1 cycle, where 1 cycle is 720 degrees which is two times the revolution of crank shaft where one cylinder completes four strokes.

In order to judge a misfired cylinder by using the aforesaid principle, a signal which is the base for discriminating each cycle is necessary, and signals from phase sensor are used therefore. The phase sensor is a sensor for providing pulses at each revolution of a cam shaft, or providing pulses dropping to zero voltage at every 720 degrees as shown in FIG. 3.

A misfired cylinder is judged from a relation between a standard pulse of phase sensor thus provided and peak of the fluctuated incline curve of the signal detected by the wide—range oxygen sensor. A phase difference is calculated up to the second peak of fluctuated incline curve of the signal of oxygen concentration caused by misfire from a standard pulse of the phase sensor to discriminate a misfired cylinder according to which range of the standard phase angle the relevant phase difference belongs.

In other words, if a phase difference thus calculated is within $\theta 1$ (engine revolution N, engine load L)~$\theta 2$ (N, L), it is judged that a misfire has occurred at the first, cylinder.

If the phase difference is in the range of $\theta 2$ (N, L)~$\theta 3$ (N, L), it is judged that a misfire has occurred at the third cylinder. If within $\theta 3$ (N, L)~$\theta 4$ (N, L), a misfire is presumed to have occurred at the fourth cylinder, and if within $\theta 4$ (N, L)~$\theta 1$ (N, L)+720 degrees, it is discriminated that a misfire has occurred at the second cylinder.

Detection of these kinds of misfire occurrence and judgment of misfired cylinders can be explained from the flow chart of FIG. 4, which includes the steps of receiving signals from various sensors to discriminate whether a fluctuated incline curve of the signal from wide—range oxygen sensor surpasses the standard value, calculating a phase difference of a second peak at the fluctuated incline signal from the wide—range oxygen sensor relative to a standard pulse of phase sensor and judging to which standard phase angle range the calculated phase difference belongs, to thereby discriminate a cylinder on which a misfire has occurred.

However, there is a problem in the judging method of engine misfire and misfired cylinder by way of a signal detected from the wide—range oxygen sensor thus described in that misfire detection efficiency and judging efficiency of misfired cylinder deteriorates according to an over response characteristic change of the wide—range oxygen sensor.

Particularly, there is a problem in that the response characteristic of sensor slows down as the sensor becomes aged to decrease a fluctuated width of the sensor signal, and the phase difference between phase sensor signal used for distinguishing the misfired cylinder and a position of second peak at the fluctuated incline curve of the signal from the wide—range oxygen sensor is also changed to markedly decrease misfire occurrence and misfired cylinder distinguishing probability.

There is still another problem in that a response characteristic relative to misfired gas of wide—range oxygen sensor used for misfire detection varies per sensor, resulting in the changes in misfire detection performance per sensor.

SUMMARY OF THE INVENTION

The present invention solves the aforementioned problems and provides an automobile engine misfire detecting method which measures a response characteristic of a wide—range oxygen sensor relative to sudden concentration changes of oxygen prior to entry of conventional misfire detection judging logic on which a standard phase angle range is corrected for distinguishing a standard value of misfire detection judgment and a misfired cylinder to thereby enable judging of an accurate misfire detection and misfired cylinder.

In accordance with the present invention, there is provided an automobile engine misfire detecting method, the method comprising the steps of:

abruptly decreasing fuel injection under a predetermined engine operation condition by a predetermined amount to measure changes of signals from a wide—range oxygen sensor before and after the fuel injection decrease;

correcting a standard value for judging misfire according to changes of signals from a wide—range oxygen sensor measured at the sensor characteristic measurement step;

judging that a misfire has occurred if it is discriminated that a fluctuated incline curve of the signal from the wide—range oxygen sensor has surpassed the corrected standard value;

calculating a phase difference between a standard pulse of phase sensor and a second peak at the fluctuated incline curve of the signal from the wide—range oxygen sensor at the time of the misfire occurrence; and judging which corrected standard phase angle range the calculated phase difference belongs to to discriminate a cylinder where a misfire has occurred.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Now, one embodiment of the present invention is described in detail with reference to the accompanying drawings.

Figure 1:
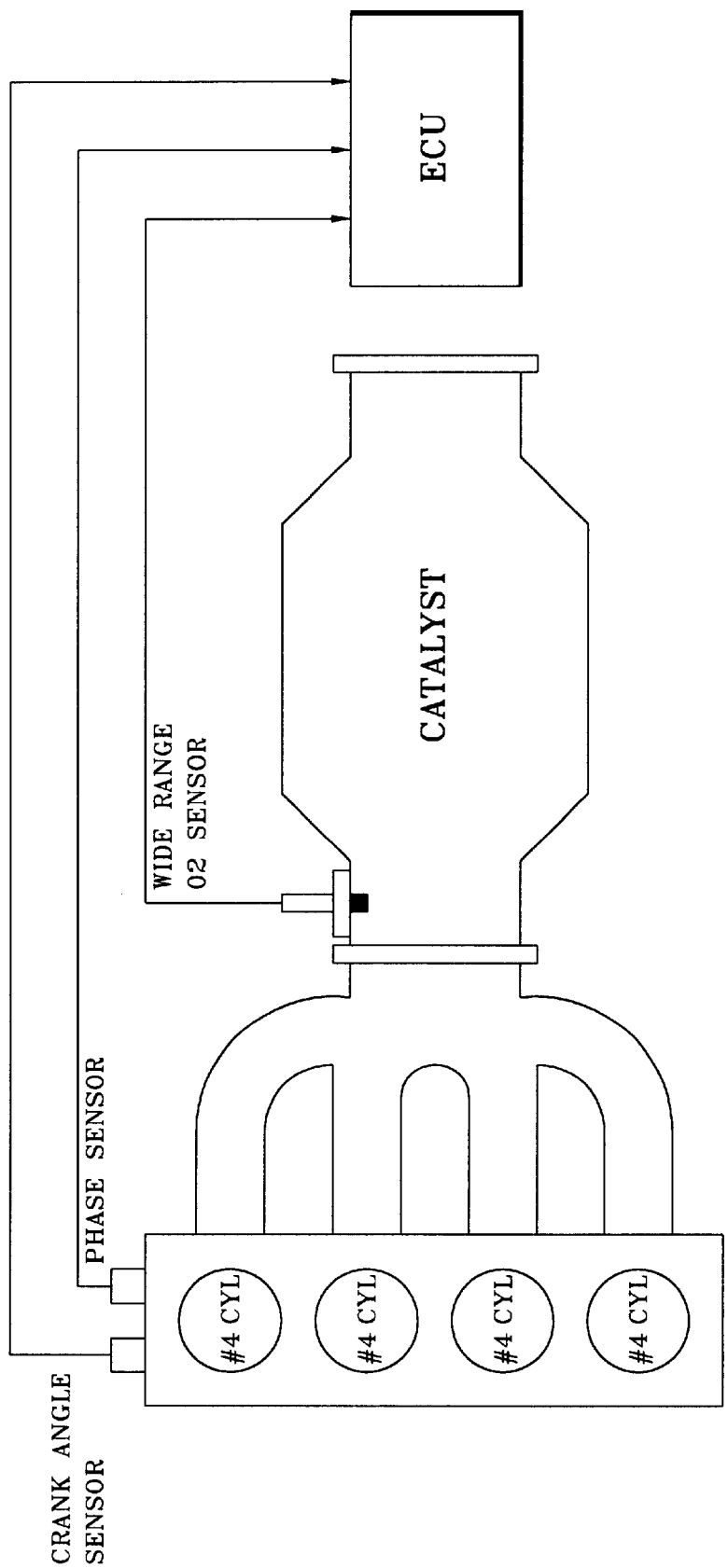
FIG. 1 is a schematic diagram for illustrating a signal input system sensors at electronic control unit for judging an engine misfire.
Figure 2:
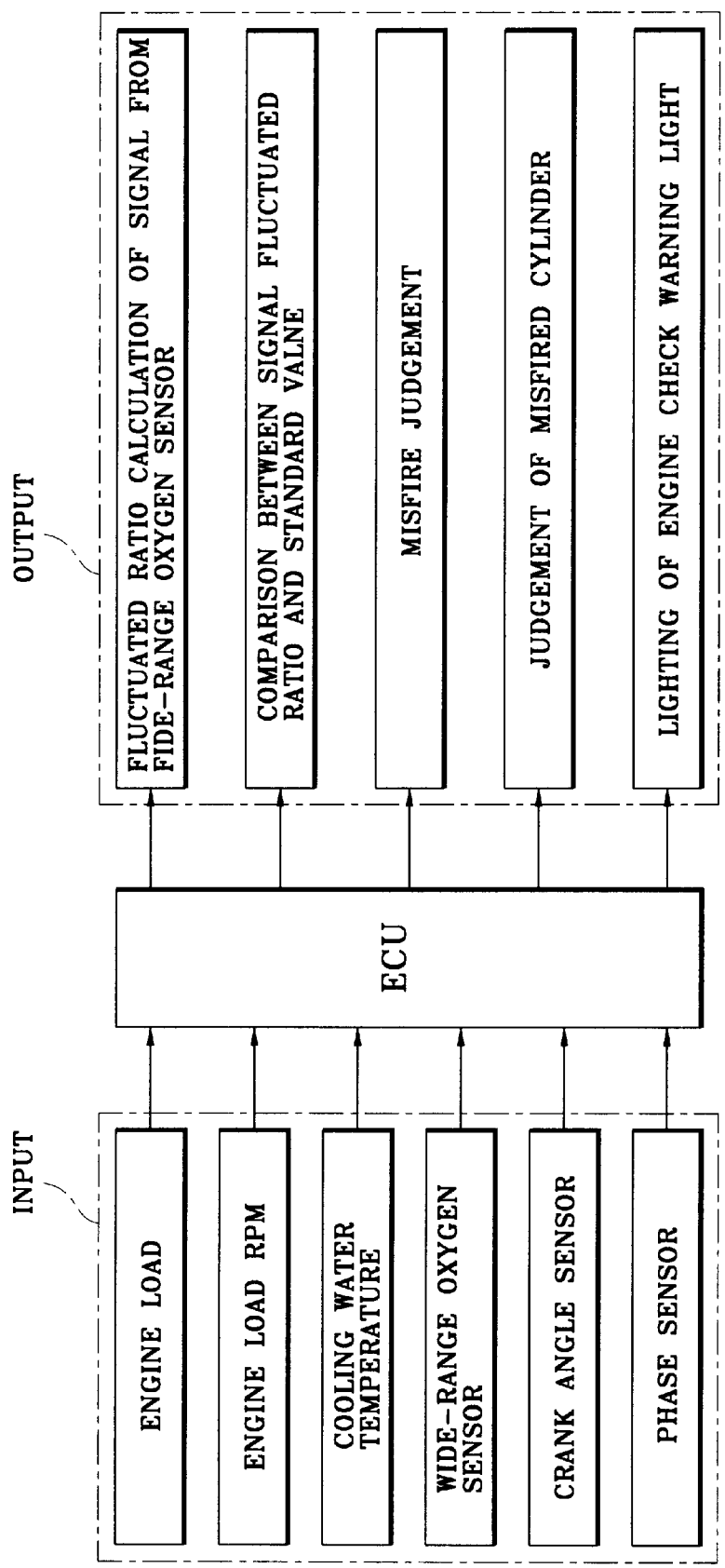
FIG. 2 is a block diagram for illustrating functional operation of electronic control unit shown in FIG. 1.
Figure 3:
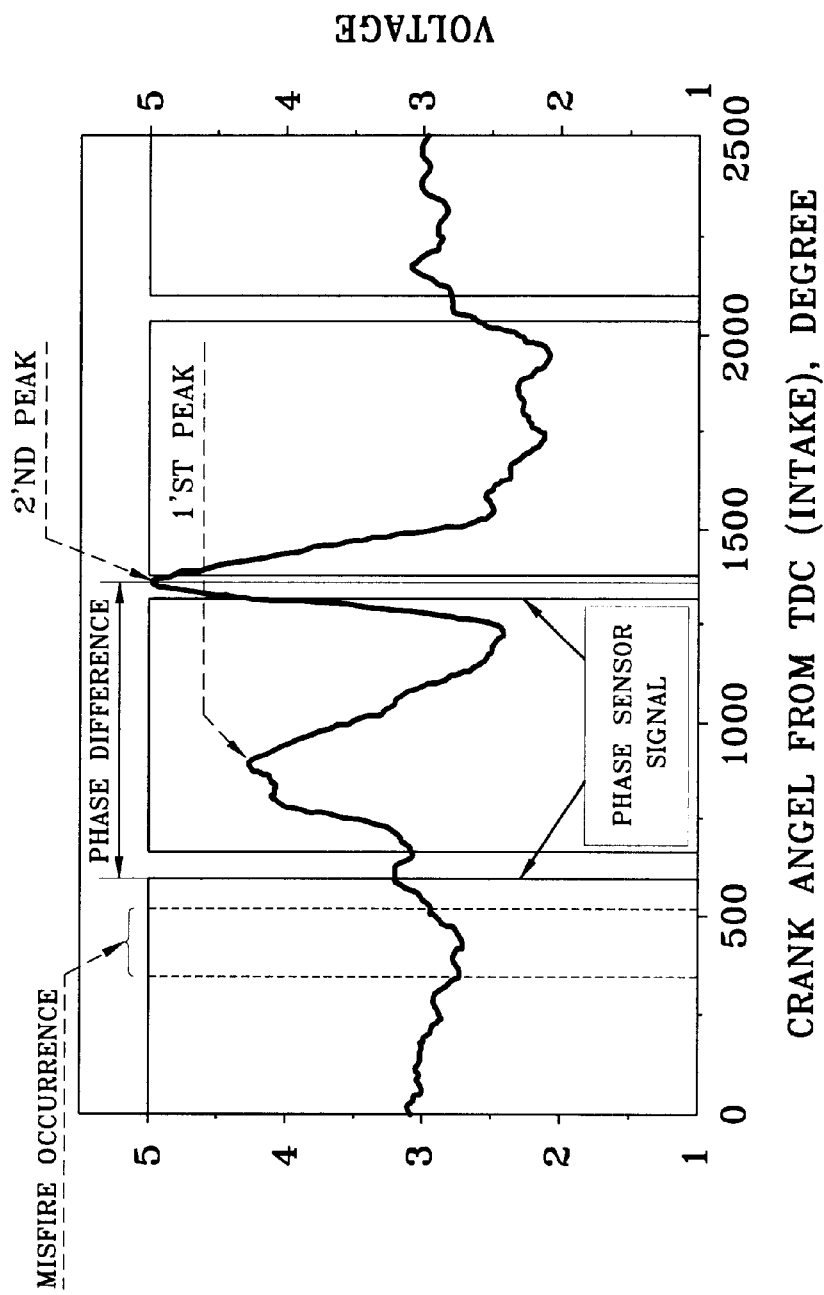
FIG. 3 is a graph for illustrating a voltage signal of a wide—range oxygen sensor relative to crank angle.
Figure 4:
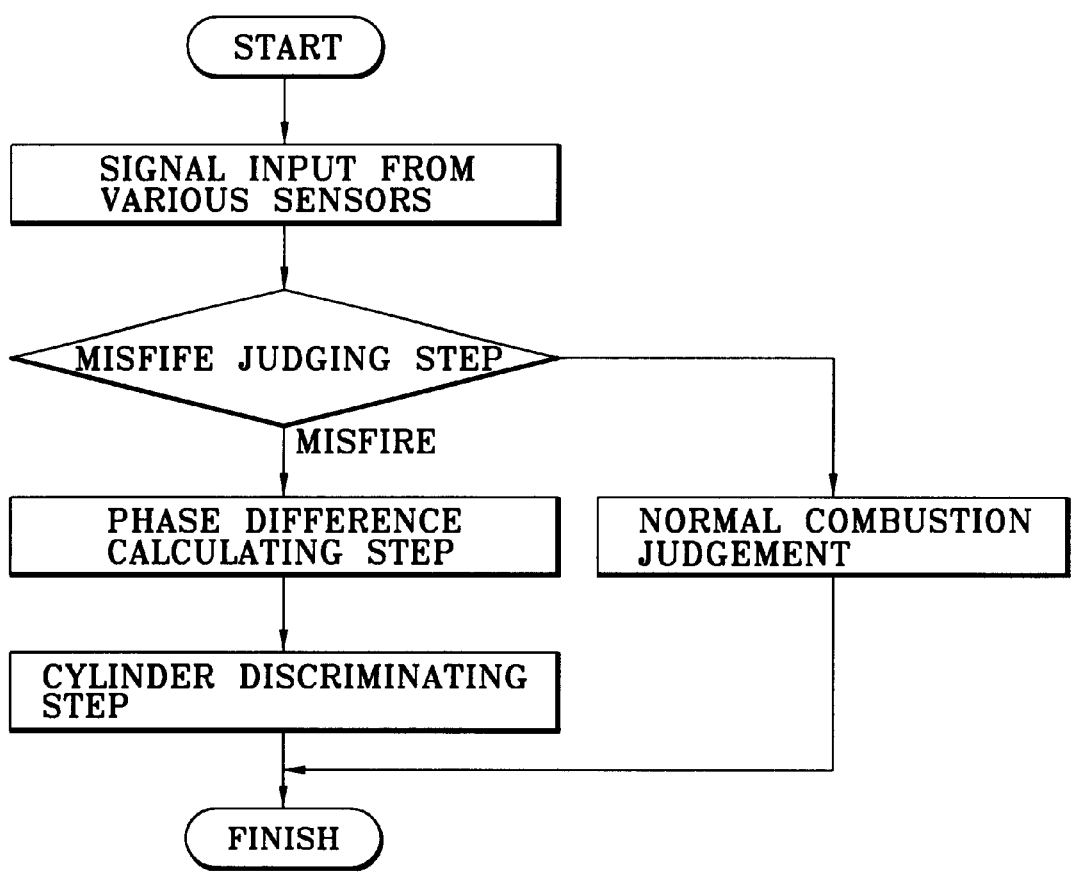
FIG. 4 is a flow chart for schematically illustrating a misfire detecting method of an engine according to the prior art.
Figure 5:
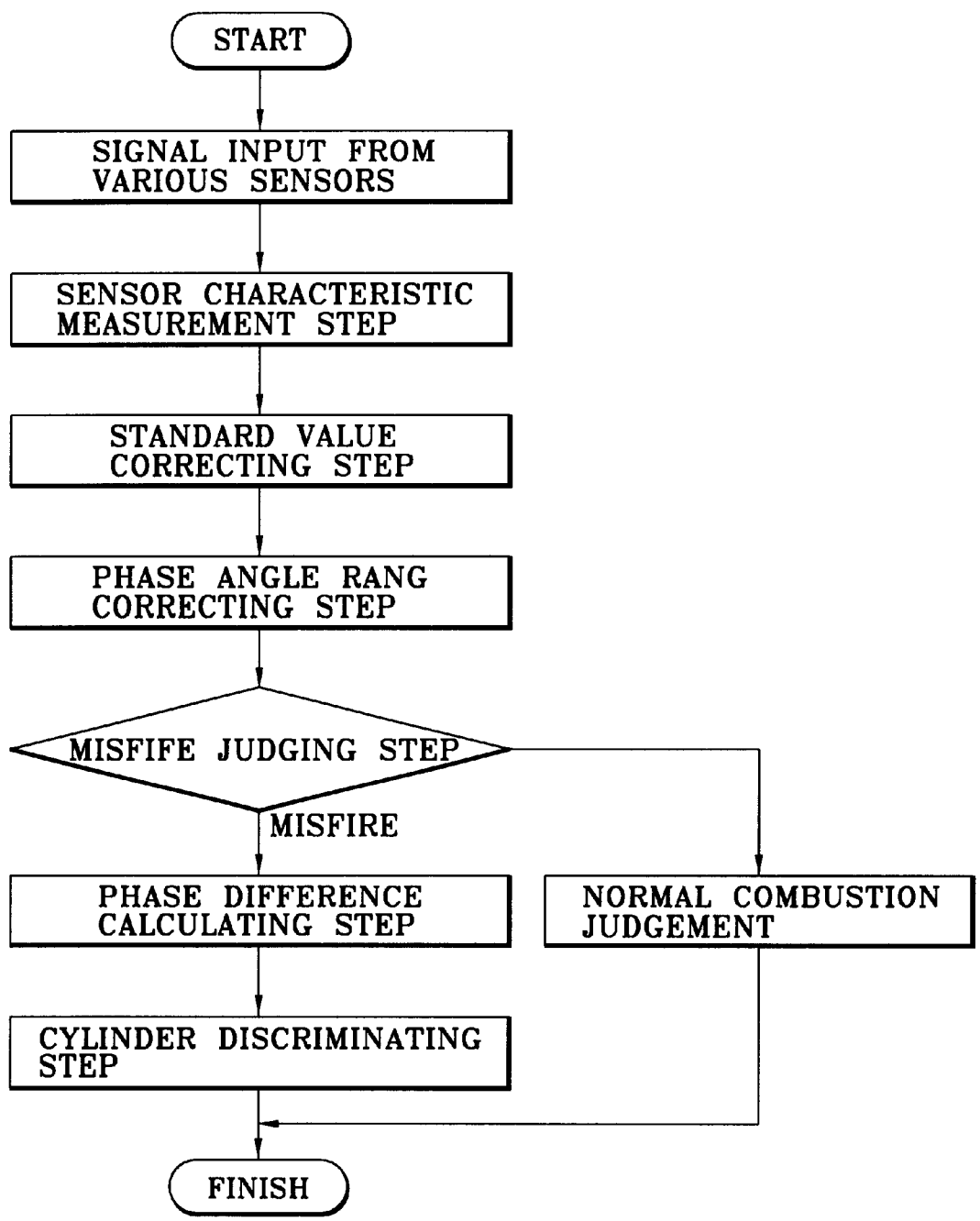
FIG. 5 is a flow chart for illustrating a misfire detecting method of an engine according to the present invention.

FIG. 5 is a flow chart for illustrating an engine misfire detecting method according to the present invention which is distinguished from FIG. 3 for illustrating a conventional misfire detecting method in that three following steps are added, the steps of:

abruptly decreasing fuel injection by a predetermined amount under a predetermined engine operation condition to measure changes of signals from the wide—range oxygen sensor before and after the decrease of fuel injection;

correcting a standard value for misfire judgment relative to the changes of signals from the wide—range oxygen sensor measured at the above sensor characteristic measurement step; and using the changes of signals from the wide—range oxygen sensor measured at the above sensor characteristic measurement step to correct a standard phase angle range for judging a misfired cylinder.

Of course, subsequent to the afore-said steps, three additional steps follow to embody the automobile engine misfire detecting method according to the present invention, the three additional steps being the steps of:

discriminating whether a fluctuated incline curve of the signal from the wide—range oxygen sensor has surpassed the corrected standard value to judge a generation of misfire if it is discriminated that the incline curve has surpassed the corrected value;

calculating a phase difference between a standard pulse from the phase sensor and a second peak at a changed rate of the signal from the wide—range oxygen sensor when misfire occurs; and discriminating which corrected standard phase angle range the calculated phase difference belongs to judge in which cylinder a misfire has occurred.

In the sensor characteristic measurement step, the ECM is prompted to suddenly decrease the fuel injection by a predetermined amount under a predetermined engine load and engine revolutions per minute (a predetermined engine operation condition). In other words, the sensor characteristic measurement step includes the steps of measuring respective signals from the wide—range oxygen sensor before and after the decrease of fuel injection and measuring a time factor when the signal from the wide—range oxygen sensor reaches a predetermined level of a converged value of the signal changed after the decreased fuel injection from a starting point of the decreased fuel injection, where the predetermined level of the converged value of the signal from the wide—range oxygen sensor is changed after the decreased fuel injection is defined at 50%.

In other words, when the fuel injection is abruptly decreased by a predetermined amount, oxygen concentration signal detected from the wide—range oxygen sensor suddenly rises to converged to a certain detected value, where the time is measured from the starting time of the decreased fuel injection to the time of reaching 50% of the converged value. At this location, the time is designated as time factor (Tf).

Next, in the standard value correcting step, a first corrected factor (F1) proportional to a reciprocal number of the time factor (Tf) is obtained, where the first corrected factor (F1) is multiplied by a standard value (C1) to obtain a corrected standard value (mC1), which can be expressed as below.

$$F1 \propto k\frac{1}{Tf},$$

where k is an experimentally obtainable proportional constant and mC1=C1×F1.

Meanwhile, in the phase angle range correction step, a phase angle (φ) corresponding to the time factor (Tf) is designated as a second corrected factor (φ) and a corrected standard phase angle range is obtained by subtracting the second corrected factor (φ) from each uppermost and lowermost phase angle of the standard phase angle range, which can be expressed as under.

In other words, the corrected standard phase angle range is the first cylinder misfire range if θ1-φ (engine revolution N, engine load L)~θ2-φ (N, L).

If θ2-φ (N, L)~θ3-φ (N, L), the corrected standard phase angle range is the third cylinder misfire range. If θ3-φ (N, L)~θ4-φ (N, L), the corrected standard phase angle range is the fourth cylinder misfire range. If θ4-φ (N, L)~θ1-φ (N, L)+720°, the corrected standard phase angle range is the second cylinder misfire range.

In other words, the ECU discriminates whether the fluctuated incline signal received from the wide—range oxygen sensor has surpassed the corrected standard value (mC1), and if surpassed, the ECU executes the misfire judging step for judging that the misfire has occurred.

Through the afore-said phase difference calculation step, a phase difference between the standard pulse of the phase sensor and the second peak of change rate of signal from the wide—range oxygen sensor is calculated when misfire occurs, and discrimination is made to which corrected standard phase angle range the calculated phase difference belongs to perform a cylinder judging step for discriminating a misfire cylinder, thereby enabling determination of in which cylinder the misfire has actually happened.

Of course, after the discrimination of whether or not the misfire has occurred and of on which cylinder the misfire has occurred is performed, other appropriate follow-up measures such as lighting of warning light "Check Engine" and the like are taken.

As apparent from the foregoing, there is an advantage in the automobile engine misfire detecting method thus described according to the present invention in that an abrupt man-made concentration change of oxygen is generated prior to entry of conventional misfire detection judging logic and the response characteristic of wide—range oxygen sensor is measured therefrom, on which a standard value of misfire detection judgment and standard phase angle range for distinguishing misfired cylinder are corrected to perform the misfire detection and misfired cylinder discrimination, thereby enabling minimizing the influence caused by an aged wide—range oxygen sensor and characteristics of each sensor and to effect a more accurate detecting operation.

What is claimed is:

1. An automobile engine misfire detecting method comprising the steps of:

abruptly decreasing fuel injection under a predetermined engine operation condition by a predetermined amount to measure changes of signals from a wide—range oxygen sensor before and after the fuel injection decrease;

correcting a standard value for judging misfire according to changes of signals from the wide—range oxygen sensor measured at the sensor characteristic measurement step;

judging if a misfire has occurred by discriminating if a fluctuated incline curve of the signal from the wide—range oxygen sensor has surpassed the corrected standard value;

calculating a phase difference between a standard pulse of a phase sensor and a second peak at the fluctuated incline curve of the signal from the wide—range oxygen sensor at a time of misfire occurrence; and judging which corrected standard phase angle range in which the calculated phase difference belongs to discriminate in which cylinder a misfire has occurred.

2. The method as defined in claim 1, wherein the sensor characteristic measurement step further comprises the steps of:

abruptly decreasing fuel injection by a predetermined amount under a predetermined engine operation condition to measure changes of signals from the wide—range oxygen sensor before and after the decrease of fuel injection; and measuring a time factor when the signal from the wide—range oxygen sensor reaches a predetermined level of a converged value of the signal changed after the decrease of the fuel injection.

3. The method as defined in claim 2, wherein the predetermined level of the converged value of the signal from the wide—range oxygen sensor changed after the decrease of fuel injection is defined at 50%.

4. The method as defined in claim 2, wherein the standard value correcting step further comprises a step wherein a first corrected factor proportional to a reciprocal number of the time factor is obtained when the first corrected time factor is multiplied by a standard, value to obtain a corrected standard value.

5. The method as defined in claim 2, wherein the phase angle range correction step further comprises a step wherein a phase angle corresponding to the time factor is designated as a second corrected factor and a corrected standard phase angle range is obtained by subtracting the second corrected factor from each uppermost and lowermost phase angle of the standard phase angle range.

* * * * *